INVENTOR.
HARRY YALE MAGEOCH
ATTORNEY.

Nov. 22, 1960

H. Y. MAGEOCH 2,961,499

ENCLOSED CONDUCTOR SYSTEM

Filed Aug. 1, 1956

INVENTOR.
HARRY YALE MAGEOCH
BY
ATTORNEY.

United States Patent Office 2,961,499
Patented Nov. 22, 1960

2,961,499

ENCLOSED CONDUCTOR SYSTEM

Harry Yale Mageoch, Havertown, Pa., assignor, by mesne assignments, to H. K. Porter Company, Inc. of Pittsburgh, a corporation of Pennsylvania Filed Aug. 1, 1956, Ser. No. 601,427

11 Claims. (Cl. 191—23)

This invention relates generally to electrical conductor systems and more particularly to improvements in an enclosed conductor system made up of a plurality of interconnected unitary assemblies each comprising a plurality of laterally spaced conductor members insulatingly supported within a housing member, the several assemblies being jointed together in longitudinal alinement to provide a conductor system of any desired length for supplying electric power to both stationary and moving equipment at any point along the length of the system.

Among the principal objects of the present invention is the provision of an enclosed conductor system which permits the use of conductor bars, of special extruded shape to insure maximum rigidity thereof, which serve not only as bus bars for carrying electrical current through the system to the point where power is taken off for operation of any desired work utility, but also as tracks for supporting and guiding the slide collector or trolley employed for current take-off wherever desired.

Also among the primary objects of the present invention is to provide a heavy duty enclosed conductor system that can be installed with a minimum expenditure of time and labor and without the use of any special installation tools or equipment, and to this end the system comprises basic factory built units which are so designed and precisely constructed as to facilitate their expeditious assembly in the field ready for use.

Another important object of the invention is to provide a conductor system wherein the current conducting bars are maintained in predetermined laterally spaced parallel relation for the full length of the system by means of precisely designed insulator units suitably spaced along the length of the system, these insulator units being removably secured within pre-fabricated sheet metal housing members for the conductors. By so supporting the conductors within the enclosures via the aforementioned insulator units, the housing members themselves need not be extremely rigid and in fact may be formed of relatively light gauge metal. Since the housing members per se do not provide the trackways or guides for the sliding collector or trolley operatively associated with the conductor bars for taking off current therefrom, it will be apparent that any deformation of or other damage to the housing while the system is in service will not necessarily disrupt operation of the system. This would also be true in the event, as may happen in service of the system, that intermediate portions of the enclosure for the conductors should become longitudinally twisted or deformed, because so long as the insulator units remain in position to support the conductor bars in their predetermined laterally spaced relation, they necessarily coact with the rigid bars to not only insure that the latter are constantly parallel throughout the length of the system but also to prevent any angular deviation from normal of the enclosure for the conductors.

Still another important object of the present invention is to provide a conductor system as above described wherein the enclosure is made up of a plurality of standardized basic units which are readily assembled in the field and as readily disassembled for servicing, inspecting and general maintenance of the system, the several housing parts which make up the complete enclosure being relatively separable to afford convenient access to the interior of the enclosure in any selected portion thereof for replacement and servicing of parts as may be required.

A further object of the invention is to provide an enclosed conductor system which is adapted for use outside of as well as within a building or other enclosure, and to this end the conductor enclosure is provided with means for conducting rain water and the like away from the interior thereof and so prevent any possibility of water coming into contact with the conductors, its associated trolley or other electrically conductive parts of the system.

A still further object of the invention is to provide the conductor system with an enclosure which completely houses the conductor bars except for a slot extending lengthwise along the bottom of the enclosure to serve as a passage for the articulated arm extending laterally of the trolley or current collector, slidably supported upon the conductor bars, the said slot being formed between a pair of bottom cover plates which are so relatively positioned as to provide a labyrinth type of slot affording maximum security against such accidental or unintentional insertion of an object into the interior of the enclosure as might contact the conductors or other live electrical parts of the system.

As has been hereinbefore mentioned, the assembly of conductor bars and their supporting insulating units within the enclosure in accordance with the present invention not only insures constant parallel relation of the conductor bars throughout the full length of the system but also prevents any tendency for the enclosure to twist angularly about its longitudinally extending axis. This absence of any angular displacement of the enclosure relatively to the conductors supported in predetermined spaced relation by the insulator units insures in turn that the aforesaid slot in the base wall of the enclosure is at all times maintained in proper alinement with the trolley arm terminal block mounting of the work utility which is powered by the system, in consequence of which the articulated arm of the trolley moves freely through the slot for the full effective length of the system.

Other objects and advantages of the invention and economies effected by and resulting from the construction and assembly of the component parts of the system of the present invention will appear more fully hereinafter, it being understood that the invention consists substantially in the combination, construction, location and relative arrangements of parts, all as described in the following specification, as shown in the accompanying drawings and as finally pointed out in the appended claims.

Figures 1, 2, 3, 4:
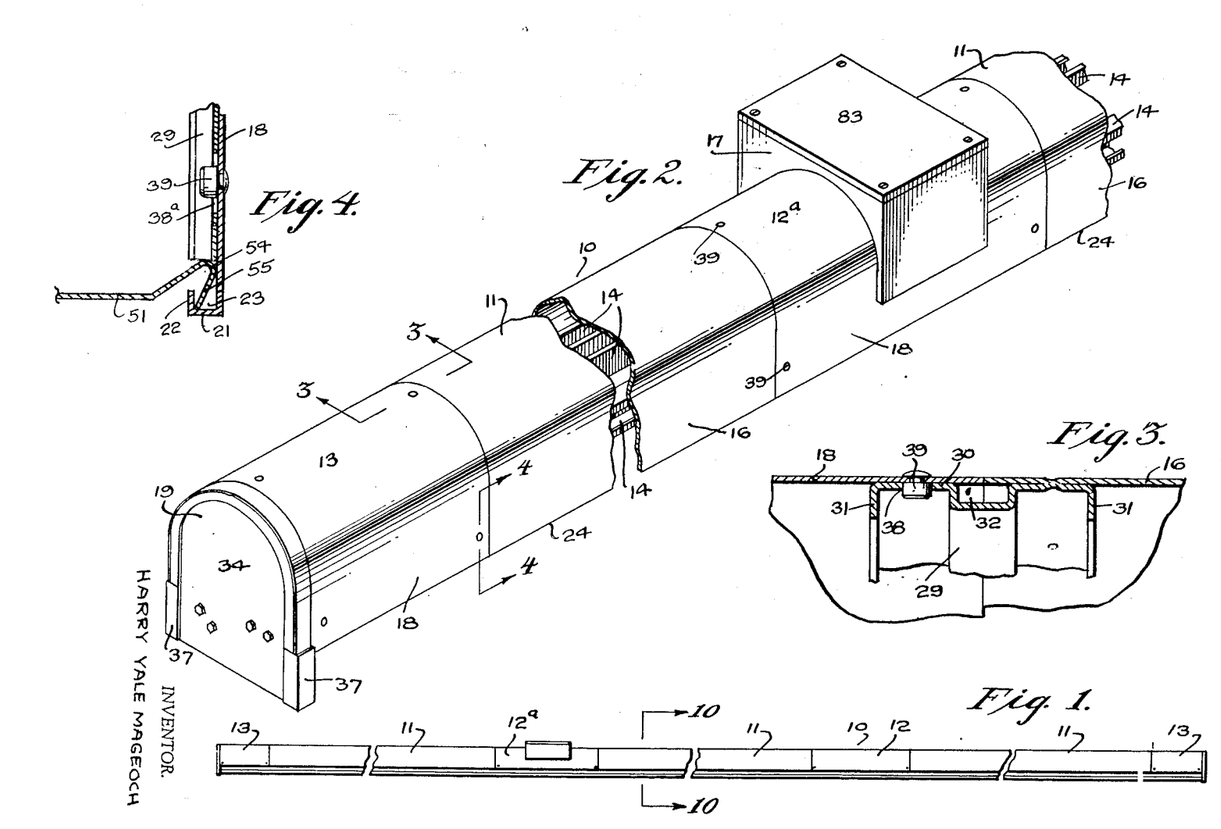
Figure 1 is a side elevational view of an enclosed conductor system as constructed in accordance with and embodying the principles of the present invention.
Figure 2 is a perspective view on a somewhat enlarged scale and with parts broken away showing a portion of the system illustrated in Figure 1.
Figure 3 is a longitudinal sectional view as taken along the line 3—3 of Figure 2.
Figure 4 is a vertical sectional view as taken along the line 4—4 of Figure 2.

Referr'ng now to the drawings and more particularly to Figure 1 thereof, it will be observed that the enclosed conductor system of the present invention may be of any desired length and is built up in the field to the desired length by assembly of a plurality of longitudinally alined basic units of standardized construction. Thus, in the conductor system shown in Figure 1 and therein designated generally by the reference numeral 10, there are employed three main assemblies 11 which are interconnected as shown by two intermediate coupling assemblies 12 and 12a and are closed off at the opposite extremities of the system by end closure assemblies 13—13.

The main assemblies 11 each include as component parts thereof a plurality of electrical conductors bars 14 suitably supported by specially des'gned and accurately molded insulators 15 disposed within a pre-formed sheet metal housing member 16 which serves as the enclosure for the conductor bars of the system. The housing members 16 of the main assemblies 11 may be of any convenient predeterminedly fixed length, e.g., 28 feet, each having operatively associated therewith, as will presently be described, a set of the conductor bars 14 each of such un'form length as to permit free projection thereof a uniform distance beyond each opposite end of their associated housing member.

The intermediate coupling assemblies 12 and 12a are of like construction excepting that one of them, e.g., that designated 12a, is provided with a feeder box 17, through which current from the main supply is delivered to the conductor bars 14 of the enclosed system. These intermediate coupling members are relatively short, say 2 feet in length, as compared with the length of the main assemblies 11, and essentially comprise pre-formed sheet metal housing members 18 shaped complementally to those of the main assemblies to serve as removable enclosures for the jointed ends of the several sets of the conductor bars 14 employed in making up the complete system. As mentioned above, each set of the laterally spaced parallel conductor bars 14 freely extend a predeterm'ned distance beyond the opposite ends of the housing members 16 of the main assemblies 11, this freely extending length of the conductor bars being approximately half the length of the intermediate housing member 18 so that upon assembly of the longitudinally alined component parts of the enclosed conductor system the jointed ends of adjacent lengths of the longitudinally alined conductor bars are located approximately midway between the oppos'te ends of each intermediate housing member 18. It will be understood, of course, that any desired number of the main assemblies 11 may be longitudinally alined to make up a system of the desired overall length and that each adjacent pair of such assemblies 11 are joined together by an intermediate coupling assembly 12 serving as a readily removable enclosure for the jointed ends of the conductor bars, any one of wh'ch intermediate coupling assemblies, such as 12a, may be fitted with a feeder box 17 in which the electrical connections are made between the main power supply lines and the conductor bars of the system.

The interconnected conductor bars 14 of the system respectively extend freely beyond the opposite extremities of the endmost main assemblies 11 and are enclosed by the end closure assemblies 13—13, each of which latter comprises an end cap 19 and a pre-formed sheet metal housing member 20 of a shape complemental to that of the main and intermediate sheet metal members which enclose the conductor bar of the systems.

It will be noted that all of the pre-formed sheet metal housing members 16, 18 and 20 are of substantially the same inverted U-shape in transverse cross-section so that upon assembly of the several sections of the system the several housings conjointly form in effect a continuous enclosure of substantially uniform shape and dimension throughout the length of the system. There is however, at least one important difference between the ma'n housing members 16 and the coupling and end housing members 18 and 20. It will be observed that whereas the opposite longitudinally extending bottom edges of the coupling and end housing members 16 are respectively inturned, as at 21, and flanged, as at 22, to provide upwardly presenting channels 23—23 extending along the opposite inner s'des of each of the members 18 and 20 for the full length thereof, the housing members 16 are each devoid of any such channels. However, as most clearly appears in Figure 7, the bottom edges of the main housing members 16 terminate in a horizontal plane coplanar with that of the inturned base walls 21 of the channels 23—23 of the supplemental housing members 18 and 20, so that upon assembly of the several housing members in longitudinal alinement w:th one another, the bottom side edges of the enclosure for its full length are normally disposed in a common horizontally extending plane.

Figure 10:
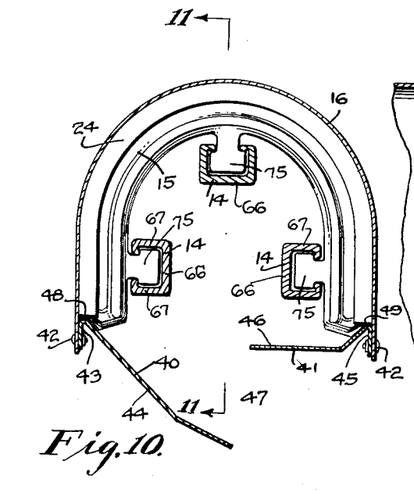
Figure 10 is a transverse sectional view as taken along the line 10—10 of Figure 1.
Figure 11:
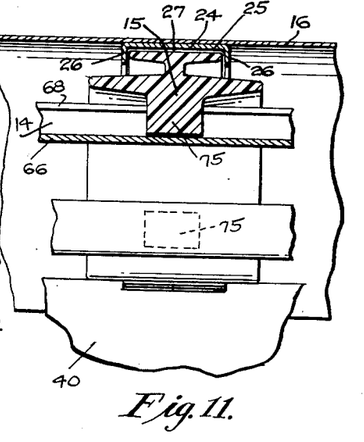
Figure 11 is a vertical sectional view as taken along the line 11—11 of Figure 10.
Figures 16, 17, 18:
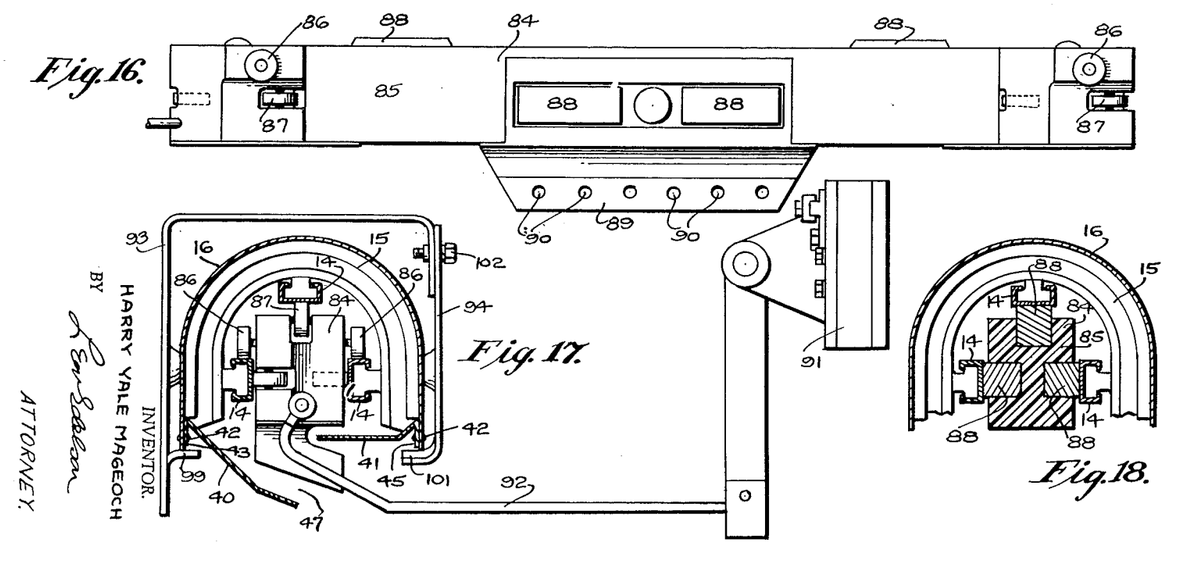
Figure 16 is a side elevational view of the slide collector or trolley.
Figure 17 is an end elevational view showing the slide collector or trolley operatively mounted in position upon the enclosed conductor bars, the enclosure in transverse section being shown in association with one of the brackets for supporting the same.
Figure 18 is a view showing the slide collector or trolley in transverse section and in operative association with the enclosed insulator-supported conductor bars of the system.

With reference now more particularly to the housing members 16 of the main assemblies 11, it will be observed that each of them is inter'orly fitted with a plurality of longitudinally spaced insulator retaining members 24. These members 24, which are of pre-formed sheet metal, are generally of inverted U-shape, and, as most clearly shown in Figures 10, 11 and 18, are each provided with a transversely extending web portion 25 having inturned parallel flanges 26—26 along its opposite sides to form a channel 27 adapted to removably accommodate therein a molded insulator 15 (see Figures 12, 13 and 14) for supporting the conductor bars 14 in their proper laterally spaced parallel relation within the enclosure therefor. These insulator retainer members 24 are shaped to snugly fit within the interior of the housing members 16 and are permanently secured in position, preferably by weld'ng their web portions 25 to the overlying wall portions of the housing members in which they are disposed. It will be noted that the opposite side leg portions of the insulator retainer members 24 respectively terminate somewhat short of the longitudinally extending bottom edges of the housing members 16, the reason for which will appear hereinafter.

Also welded or otherwise fixedly secured to each of the opposite ends of the main housing members 16 is a pre-formed sheet metal coupling member 29 of inverted U-shaped corresponding to the transverse cross-sectional shape of the housing members. These members 29 are each provided with a transversely extending web portion 30 having inturned parallel flanges 31—31 along its opposite sides for strengthening and rigidifying the same, the web portion 30 being centrally depressed to form an outwardly presenting channel 32 which extends uninterruptedly about the curve crown portion and along the opposite side portions of the coupling member 29. Each of these coupling members 29 is so disposed and secured within an end of each housing member 11 as to present the end of the latter in substantial registry with the median plane of the coupling member, in consequence of which approximately one half of the coupling member 29 projects freely beyond that end of the housing member 11 to which it is secured and so provides a support for the end of the intermediate housing member 18 when the latter is disposed in longitudinally alined abutting relation with respect to the main housing member 11 as best shown in Figure 3. It will be noted also that when the housing members 16 and 18 are so disposed in abutting relation the outwardly presenting channel 32 of the supporting coupling member 29 underlies and straddles the line of the joint between the meeting edges of the housing members and serves as a duct to prevent water entering the interior of the enclosure by way of said joint, the water being diverted by the duct to opposite sides of the enclosure for discharge therefrom at points located well away from any of the internal electrical components of the system. The channel 32 so formed in the coupling member 29 serves also to reinforce and rigidify the latter.

Figures 7, 8, 9, 19:
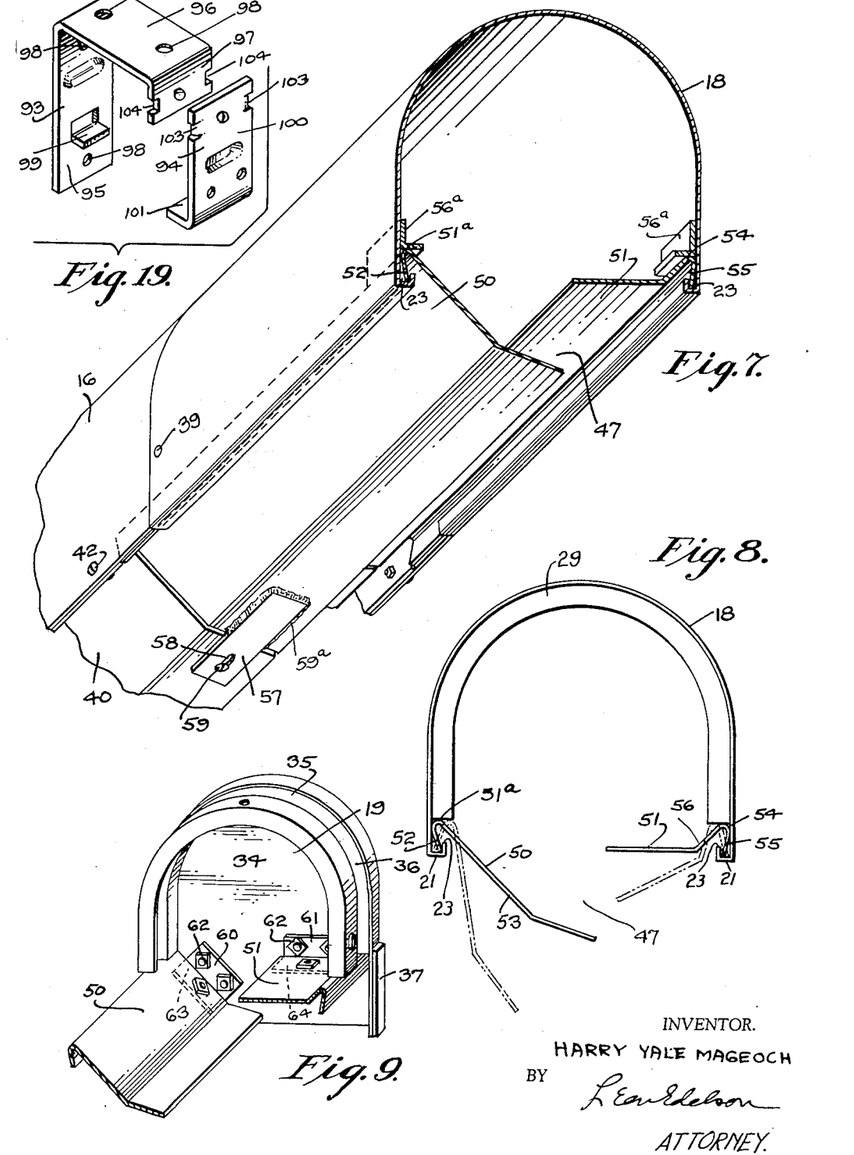
Figure 7 is a bottom perspective view of a portion of the conductor enclosure showing adjoining sections thereof connected together.
Figure 8 is an end elevational view of one of the housing members forming the conductor enclosure.
Figure 9 is a perspective view of the inside face of one of the end members of the enclosure assembly.
Figure 19 is an exploded view show'ng in perspective the component parts of a preferred construction of bracket designed for support of the enclosed conductor system of the present invention, said bracket being the same as that also shown in Figure 17.

It will be understood, of course, that the coupling members 29 secured to the outer ends of each main housing member 16 serve not only to support the intermediate housing members 18 in adjoining relation to main housing member, but they also serve to similarly support the inner ends of the endmost housing members 20—20. The outer end of the latter are in turn secured to and supported by the end caps 19—19 each of which, as best shown in Figure 9, comprises an end closure plate 34 to the inner face of which is fixedly secured, by welding or otherwise, an end coupling member 35 of the same general form and construction as the coupling members 29 secured to the ends of the main housing members 16. These U-shaped end coupling members 35 are also each provided with an outwardly presenting channel 36 adapted to underlie the line of joint between the end of the end housing member 20 and its adjoining end cap 33. In order to insure location of said joint line in registry with the channel 36, the end cap 19 may be provided upon opposite sides thereof with right angle plate members 37—37 so disposed as to present their vertically extending edges in position to serve as abutments for limiting movement of the end caps into the open ends of their adjoining housing members 20—20.

For quick-detachably joining the several housing members together to form an enclosure of any desired length, the freely projecting web portions of the coupling members 29 secured to opposite ends of the main housing members 16 are provided with a plurality of pin-receiving apertures suitably spaced about the longitudinal axis of the enclosure. Preferably, one such aperture 38 is centrally located in the curved crown portion of the coupling member, while two others designated 38a—38a, are respectively located upon the opposite parallel side portions thereof. The end cap coupling members 35—35 are each similarly provided with a like number of correspondingly spaced pin-receiving apertures.

The opposite ends of the housing members 18 and 20 are each provided with a set of inwardly projecting pins 39 spaced in correspondence with the spacing of the apertures 38 in the coupling members, which pins register with the apertures when adjoining housing members are brought into longitudinally alined abutting relation. The inherent spring of the housing members 18 and 20 not only permit their pin-fitted ends to be sprung over the apertured portions of the coupling members but also retain the housing members in their assembled relation. Preferably, the side wall apertures 38a—38a are vertically elongated as shown in Figure 4 to facilitate projection thereinto of the housing side wall pins 39—39 when the housing member fitted with such pins is vertically pressed down over the freely projecting portion of the supporting coupling member.

It will be appreciated, of course, that when the several housing members 16, 18 and 20 are assembled in longitudinally alined relation they conjointly provide an enclosure assembly which is of substantially uniform cross-section throughout its length and which is generally of inverted U-shape in its transverse cross-section. The enclosure thus formed is closed at its opposite ends by the end caps 19—19, but its bottom is entirely open. To substantially close the bottom of the enclosure assembly, each housing section thereof is fitted with a pair of bottom closure plates so relatively arranged as to provide the enclosure with a laterally presenting access slot extending the full length of the enclosure. These bottom closure plates and their relative disposition to form said access slot will now be described.

As most clearly appears in Figures 7, 10 and 11, the main housing members 16 are each provided with a pair of bottom closure plates 40 and 41 which extend lengthwise of the housing member and are respectively detachably secured to the opposite longitudinally extending edge portions thereof by bolts 42. The closure plate 40 is creased along one edge thereof to provide a securing flange 43 adapted for disposition and securement flatwise against the inner surface of one side wall portion of the housing member 16 (as see Figure 10), and with a main body portion 44 so angularly related to the mounting flange 43 that when the latter is secured in place as shown in Figure 10 the body portion 44 extends downwardly and inwardly across the bottom of the enclosure to approximately the vertical median plane of the enclosure.

The coacting closure plate 41 is likewise creased along one edge thereof to provide a securing flange 45 adapted for securement flatwise against the inner surface of the opposite side wall portion of the housing member 16. However, in the case of this closure plate 41, its main body portion 46 extends horizontally across the bottom of the housing so that its free longitudinally extending edge is spaced vertically above the corresponding edge of the closure plate 40 to provide therebetween a longitudinally extending slot 47 affording access to the interior of the enclosure from one side thereof. For a purpose to be presently explained, it is preferred that the opposite ends of the closure plates 40—41 respectively terminate somewhat short of the coupling members 29—29 secured to opposite ends of the housing member 16 with which said plates are associated, to thereby leave fully exposed the lower extremities of said coupling members. In this connection, it will be noted that the opposite extremities of each coupling member respectively terminate above the proximate longitudinally extending bottom edges of of the housing member 16, the preferred arrangement of the parts being such that when the plates 40—41 are secured in position as above described the longitudinally extending creased edges 48—49 thereof are disposed in a horizontal plane substantially coincident with the lower extremities of the coupling members 29—29. It will be understood, of course, that each of the main housing members 16 that may be employed to make up a given length of the conductor enclosure is provided with a pair of bottom closure plates 40—41 mounted in position as described above.

The intermediate housing members 18 and the end housing members 20—20 are also each provided with a pair of bottom closure plates 50—51. However, these latter plates are mounted upon their associated housing members differently than are the closure plates 40—41. Thus, it will be noted that the plate 50 is longitudinally creased, as at 51a, to provide a longitudinally extending flange 52 forming an acute angle with the main body portion 53 of said plate 50. Similarly, the plate 51 is longitudinally creased, as at 54, to provide a longitudinally extending flange 55 forming an acute angle with the adjoining body portion 56 of said plate 51. The body portion 53 of the plate 50 and the body portion of the plate 51 are respectively shaped in correspondence with the corresponding body portions of the plate members 40 and 41 so that when the several closure plates along each side of the enclosure assembly are properly secured in abutting relation they are in longitudinal, coplanar alinement and so form a labyrinth type access slot, such as that designated 47 in Figure 7, which extends along the full length of the enclosure. Inasmuch as the bottom closure plates for the end housing members 20—20 are substantially similar, both structurally and functionally, to those for the intermediate housing members 18, a detailed description thereof is not believed necessary and the same reference numerals employed to designate the intermediate bottom closure plates are used to designate the endmost bottom closure plates and specific parts thereof.

It is important to note that the bottom closure plates 50—51 are respectively of greater length than the length of the housing members with which they are associated, in consequence of which the opposite ends thereof are adapted to project into the adjoining ends of the main housing members 16 (as see Figure 7). By so extending these last mentioned plates into the opposite ends of the main housing members, the creased edges 48—49 thereof underlie the lower extremities of the coupling members 29—29 of said main housing members 16 (as see Figure 8). Also, each of the flanges 52—55 is of a depth somewhat greater than the distance between the base wall 21 of its accommodating channel 23 and the bottom edge of the coupling member, and consequently, when the flanges 52—55 are respectively nested in the longitudinally extending side wall channels 23—23 of the housing members 18 and 20 and then swung from their dotted line into their full line positions shown in Figure 8, the creased edges 48—49 of the plates 50—51 bear against the lower extremities of the coupling members 29—29 so that the flanged portions of the closure plates operate to lever or cam the side wall portions of the housings 18 and 20 downwardly and inwardly into secure, close-fitting engagement with the portions of the coupling members 29—29 embraced by said housings. It will thus be apparent that so long as the bottom closure members 50—51 are respectively positioned as shown in full lines in Figure 8, the main housing members 16, their intermediate housing members 18 and the end housing members 20, are all effectively secured together in longitudinal alinement. At the same time, the opposite side walls of the housing members 18 and 20 are effectively locked against possibility of their being sprung outwardly out of their pinned engagement with the opposite side portions of the coupling members 29 which are fixedly secured to the main housing member 11 as permanently assembled parts thereof. If desired, the housing members 18 and 20 may be interiorly fitted with short L-shaped brackets 56a (as shown in Figure 7) fixed to the opposite side walls of the housing intermediate its opposite ends to provide auxiliary supports against which the creased edges of the plates 50—51 may bear during their levering or camming action above described.

In order to secure the bottom closure members 50—51 in their effective locking position as above described, the opposite ends thereof are provided with freely projecting extensions 57 which are adapted to underlie the proximate longitudinally alined abutting portions of bottom closure members 40—41 respectively secured fixedly to the opposite side wall portions of the main housing members 16. These extensions 57 are each provided with an elongated bolt hole 58 for registry with a bolt hole formed in the proximate end of the adjoining plate, which latter is secured to its overlying extension by a bolt 59 passing through the registering bolt holes. The interconnecting extensions may be welded to the bottom closure plates 50—51, as shown at 59a in Figure 7, or they may be bolted thereto as separate elements, as shown at 57a in Figure 20.

The extreme outer ends of each endmost set of the bottom closure plates 50—51 (which are associated with the endmost housing members 20—20) need not be provided with any of the extensions 57 just referred, but instead may be fixed respectively to the end closure plates 34 of the end caps 33—33 by suitable brackets 60 and 61 secured in position by bolts 62 or otherwise. The bracket 60 is provided with a shelf-like projection 63 angularly disposed to underlie and support in proper position the end portion of the closure plate 50, while the bracket 61 is similarly provided with an extension 64 which underlies and properly supports the end portion of the closure plate 51. Bolts removably secure the plates 50—51 to their respective supporting brackets 60—61, as best shown in Figure 9.

The sheet metal enclosure assembled as described is designed, of course, to house the several conductor bars 14 which are supported within the enclosure upon the insulators 15 respectively nested in their retainer members 24. As most clearly appear in Figures 5, 10 and 20, the conductor bars 14 are each of channel cross-section having a base wall 66 and a pair of opposed parallel side walls 67—67, which latter are respectively provided with inturned flanges 68—68 to provide therebetween a slot 69 running the full length of the conductor bar or rail.

Figure 12:
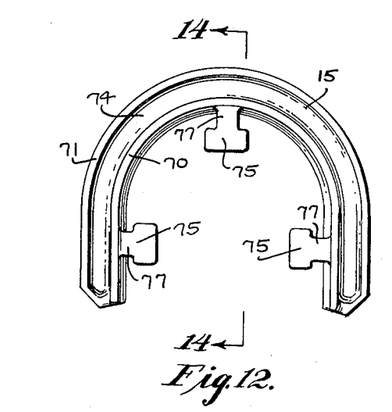
Figure 12 is an end elevational view of one of the conductor supporting insulators.
Figure 13:
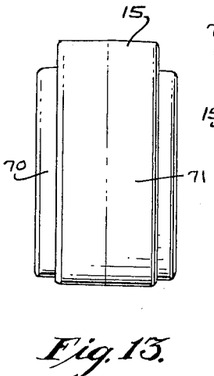
Figure 13 is a side elevational view of the insulator.
Figure 14:
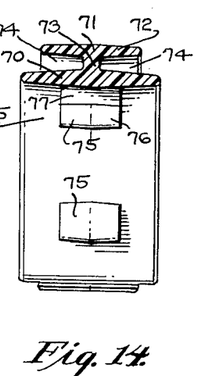
Figure 14 is a vertical sectional view as taken along the line 14—14 of Figure 12.
Figure 15:
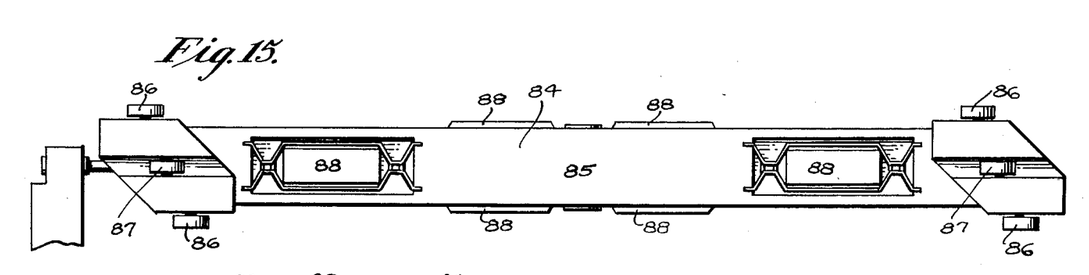
Figure 15 is a plan view of a current collector or trolley such as may be employed for taking off current from the conductor bars along wh'ch it is slidable.

The insulators 15 for supporting the conductor bar, which are molded of suitable insulating material, are generally of inverted U-shape (as see Figures 12 to 14) in side elevation and of the uniform transverse cross-section shown in Figures 11 and 14. Thus, each insulator 15 is provided with an inner main body 70 and an outer extension 71 of T-shaped cross-section the head of which is of somewhat narrower width than the body portion 70.

The head 72 of the T-shaped extension is integrally joined to the main body 70 by an intervening web or rib 73 to thereby form grooves 74—74 upon opposite sides of the rib which provide for increased electrical tracking resistance between the insulator supported conductors and the enclosure therefor.

Integrally formed upon the inner surface of the main body 70 of the insulator are a plurality of spaced conductor supporting bosses 75 each of T-shaped cross-section to provide a head portion 76 spaced from the insulator main body by a reduced neck portion 77. These bosses are preferably spaced to locate one at the top center of the insulator and the remaining two at the opposite sides thereof.

The conductor bars 14 are assembled upon the insulators 15 by slipping them lengthwise on to the supporting bosses 75 and may be secured against longitudinal movement relatively to the insulators and the enclosure within which the latter are disposed by any suitable means. The insulators, of course, are respectively disposed within their retainers 24 welded or otherwise fixed to the main housing members 16, the insulators so disposed being secured against vertical displacement from their respective retainers by the creased edges of the bottom closure plates 40—41 secured to opposite side edges of the main housing members 16 in underlying relation to the retainers 24 and the insulators 15 respectively nested therein. A simple effective means for securing the conductors 14 against longitudinal movement relatively to their supporting insulators may be stop blocks (not shown) slipped into the conductor bars while the latter are being assembled upon their insulator supports and which blocks are keyed to the conductors in contact respectively with the opposite sides of any one or more of the insulators in a single main housing member 16.

Figure 5:
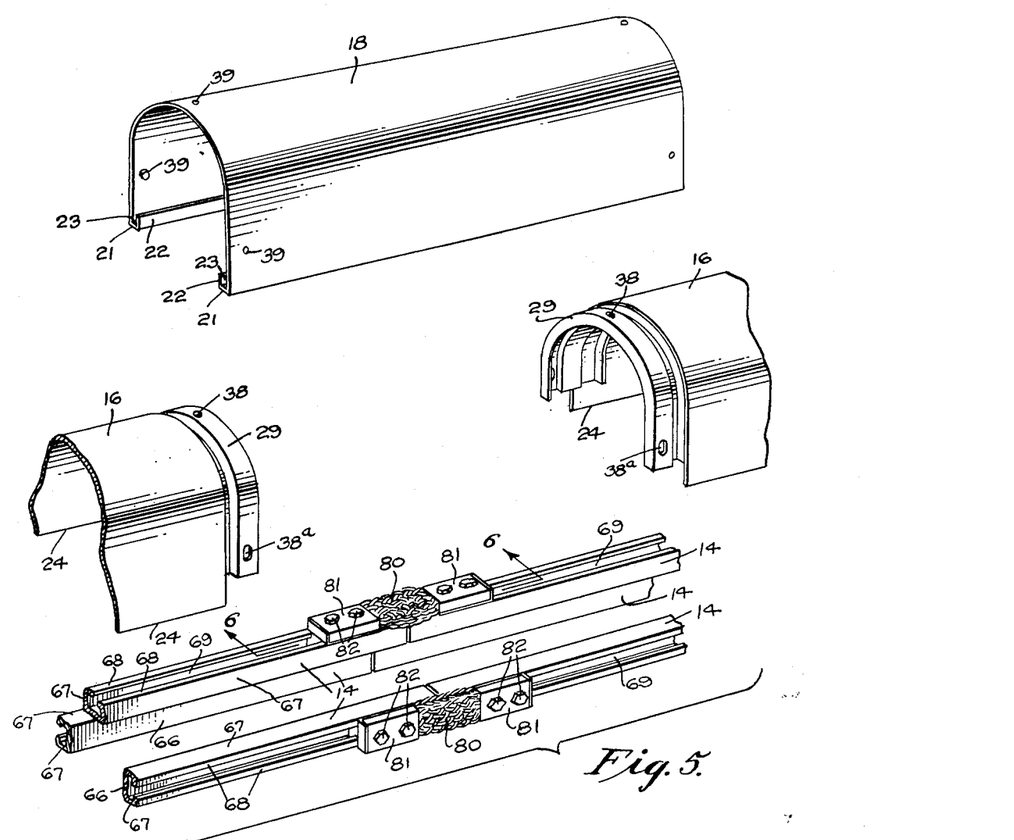
Figure 5 is an exploded view of an intermediate portion of the system showing the component parts thereof in perspective.
Figure 6:
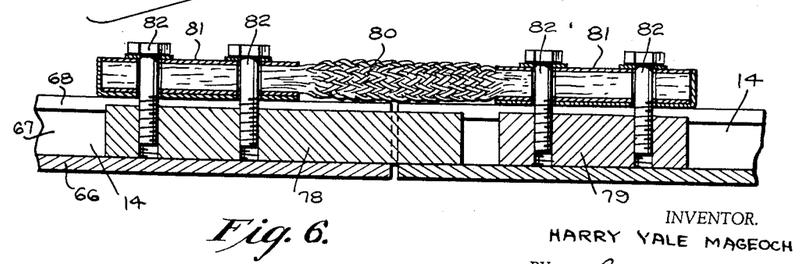
Figure 6 is a longitudinal sectional view of the adjoining interconnected end portions of a pair of rectilinearly alined conductor bars to provide an expansion joint therebetween, as taken along the line 6—6 of Figure 5.

As hereinbefore described, the several conductors insulatingly supported within each main housing member extend somewhat beyond the opposite ends of the latter so that the adjoining ends of longitudinally alined pairs of the conductors may be jointed together in the regions encompassed by the intermediate housing members 18. It is desirable also that the conductor bars be so joined as to permit free expansion and contraction thereof within their enclosure and to this end the abutting ends of the alined conductors 14 are interconnected by expansion joints as best shown in Figures 5 and 6. Thus, it will be observed that each such expansion joint includes a pair of solid blocks 78 and 79 which are respectively adapted to be slipped into opposite ends of the conductor bars to be joined together, one such block being considerably longer than the other so that it may extend beyond the conductor to which it is secured into the proximate end of the adjoining conductor. The two blocks 78 and 79 are flexibly interconnected in longitudinal spaced relation by a braided electrical conductor strip 80, the opposite ends of which are electrically connected to and protectively encased in electrically conductive flattened sheaves or sleeves 81. Bolts 82 project freely through the sheathed ends of the flexible conductor strip 80 and are threadedly connected into the blocks 78 and 79.

It will be apparent that upon loosening the bolts 82 the sheaths 81—81 of the conductor strip may be spaced from their respectively associated blocks 78 and 79 to an extent sufficient to permit insertion of the latter within the proximate ends of the conductor bars to be joined together with the sheathed ends of the conductor strip overlying respectively the slotted portions of the conductor bars and with the bolts 82 projecting through the slots of said bar. Upon then tightening the bolts 82, the blocks 78—79 are securely locked within the ends of the conductors into which they are fitted, at the same time that the sheathed ends of of the flexible conductor strips 80 are secured in electrical contact with the adjoining conductors, to thereby electrically interconnect the same while permitting relative movement thereof during expansion and contraction thereof. It will be noted that the longer block 78 which extends from one conductor into the other serves to maintain the jointed conductors in longitudinal alinement. Where the conductors are formed of aluminum and the flexible connector of copper, it may be desirable to interpose between each copper sheath or sleeve 81 and the aluminum conductor a bimetallic skim (not shown) formed of suitably laminated copper and aluminum to insure good electrical contact between the copper connector and the aluminum conductors.

The connections to the several conductors from the main power supply lines are made in the feeder box 17 which is suitably fitted to any one of the intermediate housing members 18 to form the intermediate coupling assembly, such as that designated 12a. This feeder box 17 essentially consists of a box-like enclosure suitably fitted upon the rounded top of one of the housing members 18, which latter is cut-out within the external confines of the feeder box to provide an access opening to the conductors within the assembled enclosure. Preferably, the feeder box 17 is provided with a removable cover plate 83. Either side wall or the top cover plate of the feeder box may be provided with knock-out holes (not shown) through which the power lines may be projected for connection to the conductor bars 14.

It will be noted that the several conductor bars 14, which in the arrangement shown are three in number, are relatively so disposed as to present the lower spaced pair of them with their flat side walls 67 in a common horizontally extending plane to serve as laterally spaced parallel tracks for a movable trolley 84 supported thereon. The base walls 66 of said lower spaced pair of the conductors are vertically disposed in laterally spaced parallel planes, while the base wall 66 of the uppermost conductor is disposed centrally between the two lower conductors and in a horizontal plane spaced above the latter. The base walls 66 of the three conductor bars are respectively adapted to be electrically engaged by the contact shoes of the trolley 84 slidably supported upon the conductors.

The trolley 84 may be of any desired construction and for purposes of illustrating the operation of the system of the present invention, one such trolley is shown in Figures 15 to 18. The trolley 84 as illustrated comprises a main elongated body 85 of insulating material, which body is fitted adjacent its opposite ends with side supporting rollers 86—86 and top guide rollers 87. The side supporting rollers 86—86 respectively ride on the horizontally disposed upper walls 67—67 of the laterally spaced lower pair of the conductor bars, while the top guide rollers 87 contact the base wall 66 of the third one of said conductor bars. The trolley body 85 is also provided upon each of its opposite sides and upon its top with longitudinally spaced sets of contact shoes 88 which are spring-biased outwardly of their supporting body for effective contact with the several conductor bars. Current from the several conductor bars is thus delivered through the contact shoes of the trolley 84 to a terminal block 89 suitably mounted on the trolley. The several terminals 90 of this terminal block are in turn connected by suitable leads to corresponding terminals provided on the terminal block 91 of the utility (not shown) which is powered by the system as it moves along the length thereof, this utility being mechanically coupled to the trolley 84 by a suitably articulated arm 92 extending transversely of the trolley and projecting laterally of the conductor enclosure through the bottom slot 47 formed between the bottom cover plates as hereinbefore described.

Figure 20:
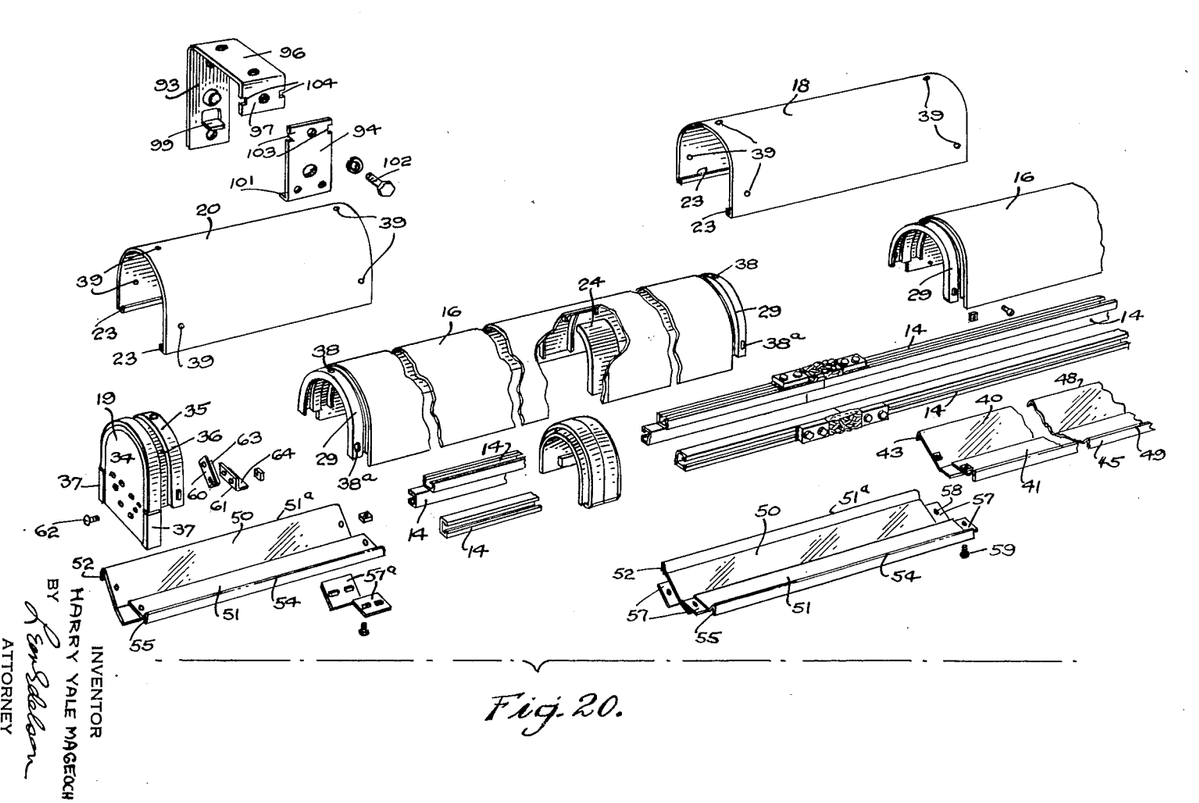
Figure 20 is an exploded view showing in perspective the several component parts of the system of the present invention.

While any suitable means may be employed for mounting the system in operative position, usually overhead from a ceiling or a side wall support, it is preferred to employ a set of supporting brackets made up of two main parts 93 and 94 as shown in Figures 17, 19 and 20. The assembled brackets may be conveniently spaced at suitable intervals along the length of the assembled enclosure and secured to the ceiling or a side support as conditions of installation may require. The bracket part 93 is formed of flat metal bent to provide a vertical leg 95 and a laterally extending top part 96 having a depending extremity 97. The leg 95 and its top part 96 are each provided with holes 98 for projection therethrough of mounting bolts. The leg 95 is also provided with a struck-in lip 99 adapted to serve as a supporting ledge or shelf upon which one longitudinal bottom edge of the enclosed conductor assembly may rest.

The coacting bracket part 94 is also formed of flat metal bent to provide a vertical leg 100 and a laterally extending bottom part 101 which underlies and serves as a supporting ledge or shelf for the opposite longitudinal edge of the conductor assembly. The two bracket parts are secured together in embracing relation about the enclosure by a bolt 102 projected through registering bolt holes provided in the overlapping portions of the bracket parts, and are restrained against relative angular displacement by lugs 103—103 formed in the bracket part 94 for interfitting engagement with the notches 104—104 formed in the depending extremity 97 of the bracket part 93. It will be evident that the bracket parts 93 and 94 may be readily separated as desired to facilitate removal and replacement of any part of the mounted enclosed conductor assembly. The opposite side legs of the bracket parts may be provided with pressed projections of the form shown in Figure 19 or in Figure 20 for maintaining said legs spaced from the side walls of the supported enclosure for the conductors.

It will be understood that any suitable type and construction of movable trolley may be employed in lieu of that illustrated, including the arm for mechanically coupling the trolley to the powered mechanism or work utility. It will also be understood that the present invention is susceptible of various changes and modifications which may be made from time to time without departing from the general principles or real spirit of the invention, accordingly it is intended to claim the same broadly, as well as specifically, as indicated by the appended claims.

What is claimed as new and useful is:

1. In an enclosed conductor system made up of a plurality of interconnected unitary assemblies secured together in longitudinal alignment to provide a conductor system of any desired length for supplying electric power at any point along the length of the system, a housing comprising main and intermediate housing members generally of the same inverted U-shape in transverse section arranged alternately in end to end relation, abutment means carried by said main housing members and disposed internally above the bottom of the housing, and a pair of bottom closure members for each housing member extending inwardly respectively from the opposite sides and longitudinally thereof, the side walls of each intermediate housing member being each provided with an inwardly turned longitudinally extending flange at the base thereof, the bottom closure members associated with the intermediate housing members being extended into the adjacent main housing members and being provided with downwardly turned longitudinally extending lips removably wedged between the said flanges and the abutment means carried by the main housing members, whereby the intermediate housing members are held to said main housing members and simultaneously the closure members associated with the intermediate housing members are held in alignment with the closure members associated with said main housing members.

2. In an enclosed conductor system, a housing as defined in claim 1 wherein the abutment means carried by the main housing members and disposed internally above the bottom of the housing are members extending in longitudinal continuation of the main housing members and fitted snugly each into the opposed end portion of the adjacent intermediate housing member.

3. In an enclosed conductor system, a housing as defined in claim 1 wherein the abutment means carried by the main housing members and disposed internally above the bottom of the housing are members extending in longitudinal continuation of the main housing members and fitted snugly each into the opposed end portion of the adjacent intermediate housing member, and the inwardly turned longitudinally extending flange at the base of each intermediate housing member side wall terminates in an upwardly turned longitudinally extending portion disposed in inwardly spaced relation to the side wall and in underlying spaced relation to the associated terminal portions of the snugly fitted members aforesaid.

4. In an enclosed conductor system made up of a plurality of interconnected unitary assemblies secured together in longitudinal alignment to provide a conductor system of any desired length for supplying electric power at any point along the length of the system, a housing comprising main and intermediate housing members generally of the same inverted U-shape in transverse section arranged alternately in end to end relation and con- jointly forming the top and opposite side walls of the housing, a pair of closure members removably secured to opposite side walls of each housing member extending inwardly toward one another respectively from the side walls aforesaid and longitudinally with the latter, one of each of said pairs of inwardly extending closure members extending substantially horizontally and the other extending downwardly as well as inwardly to a point spaced below and substantially underlying the inmost edge of said horizontally extending closure member, thereby conjointly forming a bottom closure for said housing having a longitudinally extending aperture located in the housing vertical median plane, a plurality of insulator members generally of inverted U-shape positioned within said housing and spaced relative to one another along the length thereof each with the opposed lower end portions thereof seated upon and thereby supported respectively by the associated bottom closure members, a plurality of flange elements of inverted U-shape extending inwardly from the walls of the housing members for direct engagement with said insulator members and operating to secure the same against displacement longitudinally of the housing, and at least one conductor bar carried by and bridging between said insulator members.

5. In an enclosed conductor system, as defined in claim 4 wherein the flange elements of inverted U-shape mounted within the main housing members for securing the insulator members against displacement longitudinally of the housing are channel members having side flanges extending inwardly toward the housing interior, and the insulator members are slidably fitted respectively into said channel members, each between the inwardly extending flanges of the associated channel member.

6. The enclosed conductor system, as defined in claim 5 including at least a pair of said channel members for each main housing member, the insulator members associated therewith being slidably fitted respectively into said channel members, each between the flanges of the associated channel member, and adjacent sections of the said at least one conductor bar extending unsupported into the intermediate housing members in end to end relationship and are connected together there to facilitate access thereto.

7. In an enclosed conductor system as defined in claim 5 wherein the insulator members are essentially H-shaped in transverse section, being provided with outer and inner flanges interconnected by a central web, and the outer flanges of the insulator members are removably fitted respectively into said channel members, each between the flanges of the associated channel member, the inner flanges of the insulator members being disengaged from the flanges of the associated channel members.

8. In an enclosed conductor system as defined in claim 7 wherein the said at least one conductor bar is a channel member carried by portions of said insulators formed integral with the inner flanges of the insulators and projecting inwardly therefrom to operatively engage said conductor bar for axial sliding movement of the latter relative thereto.

9. In an enclosed conductor system made up of a plurality of interconnected unitary assemblies secured together in longitudinal alignment to provide a conductor system of any desired length for supplying electric power at any point along the length of the system, a housing comprising main and intermediate housing members generally of the same inverted U-shape in transverse section arranged alternately in end to end relation, and a pair of bottom closure members for each housing member extending inwardly respectively from the opposite sides and longitudinally thereof, said closure members conjointly forming a bottom wall for said housing affording a labyrinthral opening between the opposite side closure members and extending from one end to the other of said housing, the side walls of each intermediate housing member being each provided with an inwardly turned longitudinally extending flange at the base thereof, the bottom closure members associated with said intermediate housing members being each provided with a downwardly turned longitudinally extending lip removably seated upon the associated one of the flanges aforesaid for swinging movement of said closure member thereon, the bottom closure members associated with the main housing members being each fixed in position relative to the associated side wall of the latter, and on each side of said housing opposed end portions of said bottom closure members are connected together to thereby detachably secure said swingably mounted closure members in fixed position.

10. In an enclosed conductor system as defined in claim 4 wherein the opposed end portions of adjacent sections of each conductor bar are disposed in closely spaced longitudinally aligned relation to one another whereby one side of said conductor bar is adapted for travel of a member thereover in sliding contact therewith, the opposite end portions of a rigid main connecting bar are nested in and closely embraced respectively by said opposed conductor bar portions whereby the latter are secured against misalignment, said connecting bar is axially fixed relative to one of said opposed conductor bar portions and axially shiftable relative to the other whereby to accommodate expansion and contraction of the conductor bar, and said opposed conductor bar portions are connected together by flexible bridging means extending along the side of said conductor bar remote from the side thereof adapted for travel of a member thereover in the manner aforesaid, said rigid connecting bar and flexible means being conjointly operative for effectively connecting said conductor bar sections together electrically.

11. In an enclosed conductor system as defined in claim 4 wherein an auxiliary connecting bar is nested within the conductor bar portion that slidably receives the main connecting bar, in spaced relation to the latter, said conductor bars are of C shape in transverse section and the longitudinally extending opposed marginal portions thereof are clamped between said connecting bars and flexible bridging means.

References Cited in the file of this patent

UNITED STATES PATENTS

| | | |
|---|---|---|
| 280,919 | Du Shane | July 10, 1883 |
| 346,990 | Finney | Aug. 10, 1886 |
| 540,187 | Petersen | May 28, 1895 |
| 560,678 | Brandenburg | May 26, 1896 |
| 1,217,398 | Bonnell | Feb. 27, 1917 |
| 2,026,884 | Glasgow | Jan. 7, 1936 |
| 2,059,986 | Frank et al. | Nov. 3, 1936 |
| 2,148,237 | Kingdon | Feb. 21, 1939 |
| 2,170,298 | Frank | Aug. 22, 1939 |
| 2,251,230 | Ragsdale | July 29, 1941 |
| 2,353,121 | Adam et al. | July 11, 1944 |
| 2,361,536 | Frank | Oct. 31, 1944 |
| 2,588,172 | Snavely et al. | Mar. 4, 1952 |
| 2,619,553 | Krockel | Nov. 25, 1952 |
| 2,626,298 | Hammerly | Jan. 20, 1953 |
| 2,626,301 | Hammerly | Jan. 20, 1953 |
| 2,691,536 | Tamminga | Oct. 12, 1954 |
| 2,696,533 | Hammerly et al. | Dec. 7, 1954 |
| 2,706,744 | Rudd | Apr. 19, 1955 |

FOREIGN PATENTS

| | | |
|---|---|---|
| 4,162 of 1882 | Great Britain | Aug. 31, 1882 |